(12) United States Patent
Katayose (10) Patent No.: US 7,345,679 B2
(45) Date of Patent: Mar. 18, 2008

(54) INPUT CONTROL APPARATUS AND INPUT ACCEPTING METHOD

(75) Inventor: Jun Katayose, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 547 days.

(21) Appl. No.: 11/014,686

(22) Filed: Dec. 16, 2004

(65) Prior Publication Data

US 2005/0168449 A1 Aug. 4, 2005

(30) Foreign Application Priority Data

Dec. 26, 2003 (JP) ............................. 2003-432529

(51) Int. Cl.
*G09G 5/00* (2006.01)
(52) U.S. Cl. .................... 345/173; 178/18.01
(58) Field of Classification Search ........ 345/156–160, 345/162, 166, 172–179; 178/18.01, 18.03, 178/18.04, 18.05, 18.06
See application file for complete search history.

(56) References Cited

U.S. PATENT DOCUMENTS

| | | | |
|---|---|---|---|
| 4,914,624 A | 4/1990 | Rose et al. | |
| 7,119,797 B2* | 10/2006 | Kawano et al. | ............. 345/173 |
| 7,245,293 B2* | 7/2007 | Hoshino et al. | ............ 345/173 |
| 2002/0097229 A1 | 7/2002 | Dunthorn | |
| 2003/0067449 A1 | 4/2003 | Yoshikawa et al. | |
| 2004/0021704 A1* | 2/2004 | Mitsutake | .................. 345/865 |
| 2006/0161846 A1* | 7/2006 | Van Leeuwen | ............. 715/702 |

FOREIGN PATENT DOCUMENTS

| | | |
|---|---|---|
| EP | 1333364 A | 8/2003 |
| GB | 2380583 A | 4/2003 |
| JP | 09-062446 | 3/1997 |
| JP | 09 062446 A | 3/1997 |
| JP | 2000-137576 | 5/2000 |
| JP | 2000 137576 A | 5/2000 |
| JP | 2003-016502 | 1/2003 |
| JP | 2003 016502 A | 1/2003 |

* cited by examiner

*Primary Examiner*—Richard Hjerpe
*Assistant Examiner*—Mansour M. Said
(74) *Attorney, Agent, or Firm*—Brinks Hofer Gilson & Lione (57) ABSTRACT

A main control unit accepts an operation of deciding a touched button when the user releases the button on a touch panel in a menu window within a predetermined time period after touching the button without moving his/her finger along the touch panel. Also, the main control unit accepts an operation of deciding a touched button when the user keeps the button touched for more than the predetermined time period after touching the button without performing finger movement. When the user moves his/her finger along the touch panel to another position after touching a button without releasing the button in the predetermined time period, the main control unit does not accept a button deciding operation by release or long touch thereafter.

20 Claims, 4 Drawing Sheets

INPUT CONTROL APPARATUS AND INPUT ACCEPTING METHOD

BACKGROUND OF THE INVENTION

1. Field of the Invention

The present invention relates to a user interface including a display device and a touch panel disposed on a screen of the display device.

2. Description of the Related Art

As a technique related to a user interface using a touch panel disposed on a screen of a display device, the following technique has been known. That is, a vibrator for vibrating a touch panel is provided, a user's operation of touching an area of the touch panel corresponding to a button displayed on a display device is accepted as a button touching operation, and a response to the touch operation is fed back to the user by using vibration of the touch panel (e.g., Patent Documents 1 and 2: Japanese Unexamined Patent Application Publication Nos. 2003-16502 and 2000-137576).

Also, as another technique related to a user interface using a touch panel disposed on a screen of a display device, the following technique has been known. That is, after a user has touched a touch panel, a button displayed in an area of a display device corresponding to the touched position just before a release operation (user's operation of releasing his/her finger from the touch panel) is accepted as a button decided by the user (e.g., Patent Documents 1 and 3: Japanese Unexamined Patent Application Publication Nos. 2003-16502 and 9-62446).

Furthermore, in these techniques, when the user performs touch and release operations on the touch panel, if the touched position just before the release operation is different from the position of the button corresponding to the touched position at the touch operation, selection of the released button is not accepted (e.g., Patent Document 3).

When the above-described known techniques of a user interface using a touch panel disposed on a screen of a display device are applied to, for example, a user interface of a vehicle-mounted system, the following problems arise.

In a vehicle-mounted system, relatively compact display device and touch panel are often used because of limited space, and thus the size of buttons displayed for accepting user operations are small in many cases. Further, a user has to operate a touch panel under an unstable environment while driving a car.

In another case, after a user has touched a position on a touch panel corresponding to a desired button, the user's finger on the position may be moved along the touch panel to another position corresponding to another button due to movement of a car. Therefore, as in Patent Document 1, when the operation of a button corresponding to a release position is unconditionally accepted, which means that a button operation is accepted against the user's intention.

On the other hand, a user's touch period during a button operation (period when the user keeps a button touched) is different depending on users. As the touch period is longer, the possibility that the touched position changes due to movement of a car increases. Therefore, as in Patent Document 3, if a button operation is unconditionally refused in a case where the touched position and released position are not at the position corresponding to the same button, a user who keeps a button touched for a long time cannot operate a desired button.

Further, when the above-described method is applied to a vehicle-mounted system, a user cannot always touch a proper position on the touch panel corresponding to a desired button due to the small size of the buttons and an unstable environment of a moving car.

SUMMARY OF THE INVENTION

Accordingly, an object of the present invention is enabling a user to perform an operation according to the user's intention more easily and reliably in a user interface using a touch panel disposed on a screen of a display device.

In order to achieve the object, according to an aspect of the present invention, an input control apparatus including a display device and a touch panel disposed on the display device is provided. The input control apparatus includes a screen display unit for displaying, on the display device, an operation screen which includes one or a plurality of buttons for accepting an operation by a user; a button-deciding-operation by release accepting unit for accepting an operation of deciding a button when the user releases his/her finger from a position on the touch panel corresponding to the button on the operation screen within a predetermined time period after touching the position; and a button-deciding-operation by long-touch accepting unit for accepting an operation of deciding a button when the user keeps a position on the touch panel corresponding to the button on the operation screen touched for more than the predetermined time period after touching the position, and for refusing acceptance of an operation of deciding a button by the button deciding operation by release when release occurs thereafter.

In this input control apparatus, a button deciding operation is accepted when the user releases the button after touching the button. Also, a button deciding operation is accepted when the user keeps the button touched for more than a predetermined time period after touching the button. After a button deciding operation has been accepted according to the long touch, a button deciding operation according to release is not accepted. In this way, in a vehicle-mounted system, when the user keeps a button touched for a longer period than necessary, an operation of deciding the button is accepted after a lapse of predetermined time period, and a release operation thereafter is not accepted as a button deciding operation. Accordingly, an operation error caused by mis-touch due to movement of a car can be prevented.

In the input control apparatus, if the button-deciding-operation by long-touch accepting unit has accepted the button deciding operation, the unit may not accept any button deciding operation at least until the next touch on the touch panel occurs.

Preferably, the input control apparatus further includes a finger-movement detecting unit for detecting occurrence of finger movement, in which a touched position on the touch panel significantly moves by more than a predetermined distance, within the predetermined time period, and, if finger movement has been detected, refusing acceptance of a button deciding operation by the button deciding operation by release when release occurs thereafter.

In the input control apparatus, if finger movement by the user has been detected, a button deciding operation according to release is not accepted thereafter. Therefore, by applying the apparatus to a vehicle-mounted system, an operation error caused by mis-touch due to movement of a car can be prevented.

In order to achieve the above-described object, according to another aspect of the present invention, an input control apparatus including a display device and a touch panel disposed on the display device is provided. The input control apparatus includes a screen display unit for displaying, on the display device, an operation screen which includes one or a plurality of buttons for accepting an operation by a user; a button-deciding-operation accepting unit for accepting an operation of deciding a button according to a predetermined operation by the user after the user has touched a position on the touch panel corresponding to the button on the operation screen; and a finger-movement detecting unit for detecting occurrence of finger movement, in which a touched position on the touch panel significantly moves by more than a predetermined distance. If the finger-movement detecting unit has detected finger movement, the button-deciding-operation accepting unit does not accept any button deciding operation according to the predetermined operation by the user at least until the next touch on the touch panel occurs.

In the input control apparatus, if finger movement by the user has been detected, a button deciding operation is not accepted thereafter until the next touch on the touch panel occurs. Therefore, when the apparatus is applied to a vehicle-mounted system, an operation error caused by mistouch due to movement of a car can be prevented.

Preferably, in the input control apparatus including the finger-movement detecting unit, the screen display unit changes the color of the button corresponding to the touched position so that the user can distinguish the button from other buttons. Also, the input control apparatus may further include a vibrating unit for vibrating the touch panel and a vibration control unit for allowing the vibrating unit to vibrate the touch panel when the user touches a position on the touch panel corresponding to one of the buttons, when the touched position changes to a position corresponding to one of the buttons, or when the button deciding operation is accepted.

With this configuration, the user can move his/her finger along the touch panel to a position corresponding to a desired button and determine the touched position for operating the desired button based on the color of the button and vibration. At this time, an operation of deciding a button other than the desired button is not accepted. Then, after the user has determined the touched position for operating the desired button, the user once releases his/her finger from the button and performs an operation to the desired button so as to decide the button. In this way, the user can perform a button operation more reliably.

According to the present invention, in a user interface using a touch panel disposed on a screen of a display device, the user can perform an operation according to his/her intention more easily and reliably.

DESCRIPTION OF THE PREFERRED EMBODIMENT

Hereinafter, an embodiment of the present invention will be described.

Figure 1:
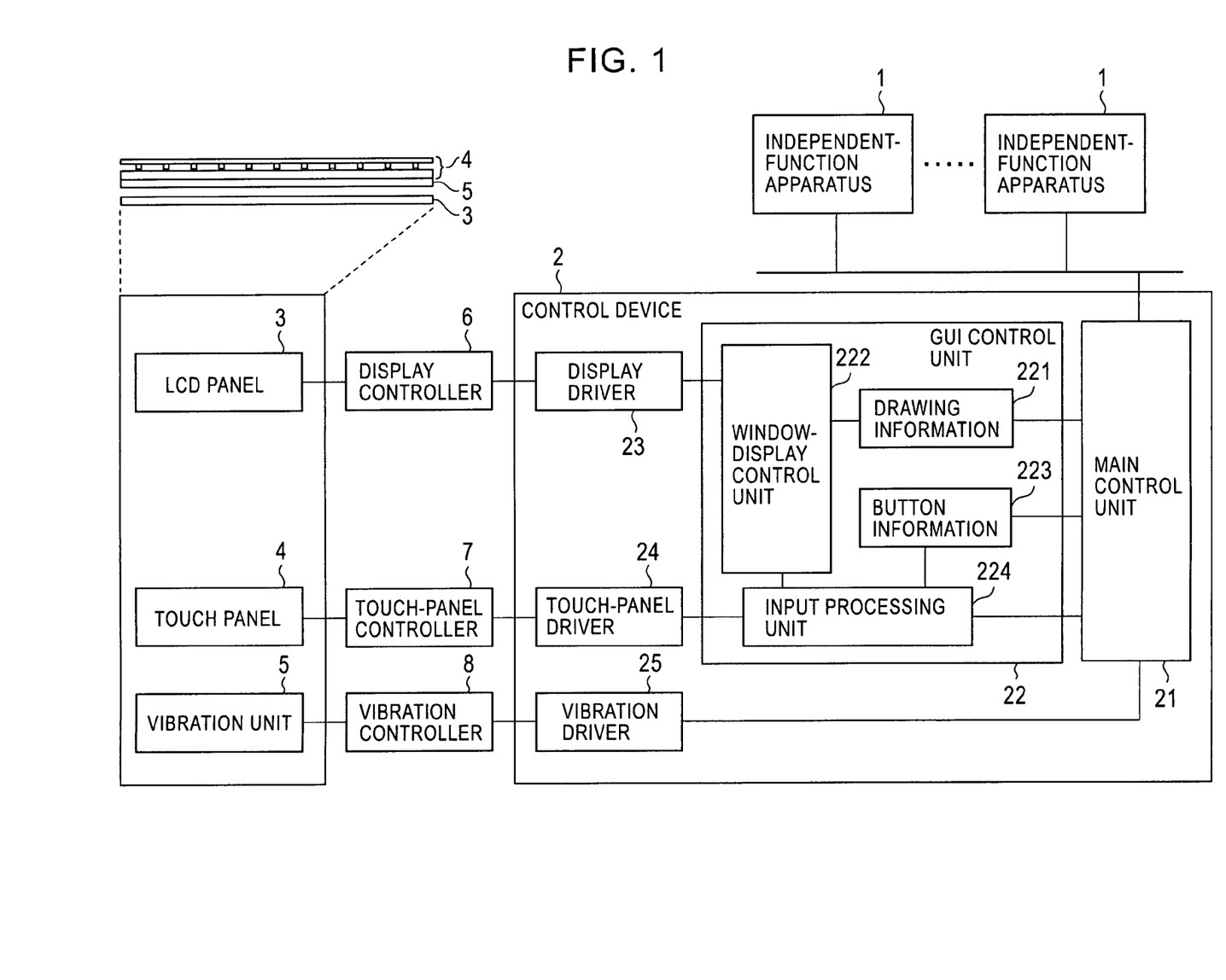
FIG. 1 is a block diagram showing the configuration of an electronic processing system according to an embodiment of the present invention.

FIG. 1 shows the configuration of an electronic processing system according to one embodiment.

As shown in FIG. 1, the electronic processing system may include independent-function apparatuses 1 having an independent function, such as an audio apparatus and a navigation apparatus; a control device 2 for controlling each of the independent-function apparatuses 1; a liquid crystal display (LCD) panel 3; a touch panel 4; a vibration unit 5; a display controller 6 for driving the LCD panel 3; a touch-panel controller 7 for detecting the occurrence of touch/release operations on the touch panel 4 and touched coordinates (coordinates of a touched position); and a vibration controller 8 for driving the vibration unit 5.

As shown in FIG. 1, the vibration unit 5 is disposed under the touch panel 4 so as to be coupled therewith and vibrates the touch panel 4. The LCD panel 3 is disposed under the touch panel 4 and the vibration unit 5.

Specifically, the control device 2 includes a main control unit 21 for providing a graphical user interface (GUI) to a user and controlling each independent-function apparatus 1 according to a user's operation accepted by the GUI; a GUI control unit 22 for executing display processing on the LCD panel 3 in the GUI and processing on the input from the touch panel 4; a display driver 23 for mediating input/output of data between the GUI control unit 22 and the display controller 6; a touch-panel driver 24 for mediating input/output of data between the GUI control unit 22 and the touch panel 4; and a vibration driver 25 for mediating input/output of data between the vibration unit 5 and the main control unit 21. In a hardware sense, the control device 2 may be a computer of an ordinary configuration which includes a CPU, a main memory, and an external storage device. In this case, each of the above-mentioned components in the control device 2 may be realized as a process which is embodied in the control device 2 when the CPU executes a computer program stored in the external storage device. Also, in this case, the GUI control unit 22 and each driver may be realized as a mechanism or expanded function of an operating system executed in the control device 2. Further, the main control unit 21 may be realized as an application which is operated on the operating system.

More specifically, the GUI control unit 22 includes a window-display control unit 222 for displaying an image of a window on the LCD panel 3 according to drawing information 221 transmitted from the main control unit 21; and an input processing unit 224 for analyzing and processing input information from the touch-panel controller 7 by referring to button information 223 transmitted from the main control unit 21.

In the above-described configuration, in order to display a menu window including buttons for accepting a user operation, the main control unit 21 writes the drawing information 221, which defines an image displayed in the menu window, into the GUI control unit 22. Also, the main control unit 21 writes the button information 223, which describes the range of coordinates of each button in the menu window and processing to be performed by the input processing unit 224 when a user operates the button, into the GUI control unit 22.

The window-display control unit 222 displays the menu window on the LCD panel 3 in accordance with the drawing information 221, which has been written by the main control unit 21 as described above.

The input processing unit 224 stores the latest touched coordinates input from the touch-panel controller 7 and provides the stored touched coordinates to the main control unit 21 according to an access from the main control unit 21.

Also, the input processing unit 224 analyzes the input of a touch operation, a release operation, and touched coordinates transmitted from the touch-panel controller 7 by referring to the button information 223, and executes the following processing.

That is, if the touched coordinates at the moment when a touch operation occurs are within the range of coordinates of a button, the input processing unit 224 transmits a button identifier of the corresponding button and a button-touch occurrence event to the main control unit 21. Also, if the touched coordinates just before the occurrence of a release operation are within the range of coordinates of a button, the input processing unit 224 transmits a button identifier of the corresponding button and a button-release occurrence event to the main control unit 21. On the other hand, if the touched coordinates at the occurrence of a touch operation are outside the range of coordinates of all the buttons, the input processing unit 224 transmits an outside-of-button touch occurrence event to the main control unit 21. Also, if the touched coordinates just before the occurrence of a release operation are outside the range of coordinates of all the buttons, the input processing unit 224 transmits an outside-of-button release occurrence event to the main control unit 21. Further, if the touched coordinates shift from the outside of the coordinates of all the buttons to the coordinates of one of the buttons during a period from a touch operation to a release operation, the input processing unit 224 transmits a button identifier of the corresponding button and a move-to-button occurrence event to the main control unit 21. On the other hand, if the touched coordinates shift from the coordinates of one of the buttons to the outside of the coordinates of all the buttons during a period from a touch operation to a release operation, the input processing unit 224 transmits a button identifier of the corresponding button and a move-to-outside occurrence event to the main control unit 21.

The main control unit 21 controls the user interface by executing the following process of accepting a button operation by using the above-described GUI control unit 22, so as to accept a user's operation on the buttons in the menu window.

Figure 2:
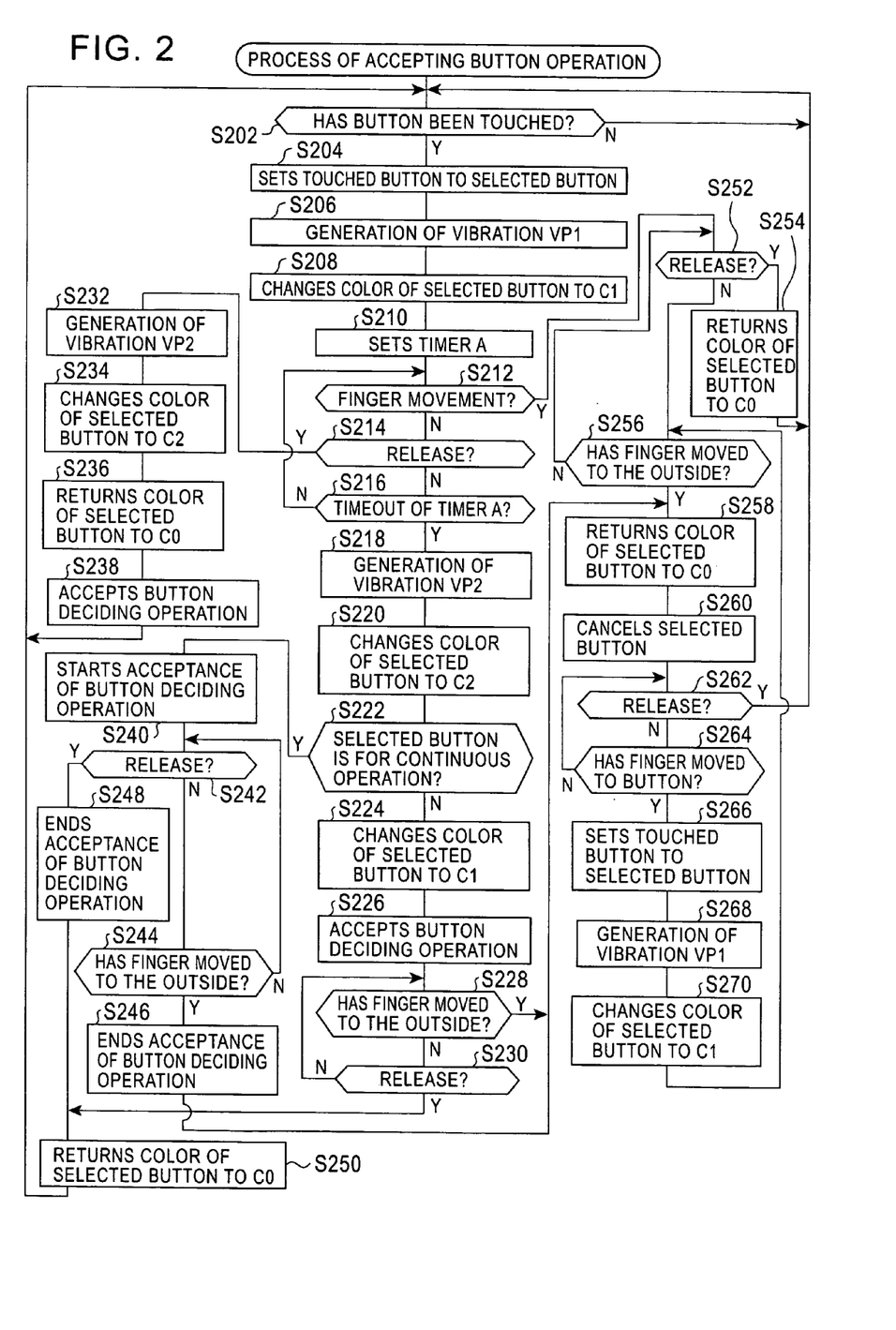
FIG. 2 is a flowchart showing a process of accepting a button operation according to an embodiment of the present invention.
Figure 3:
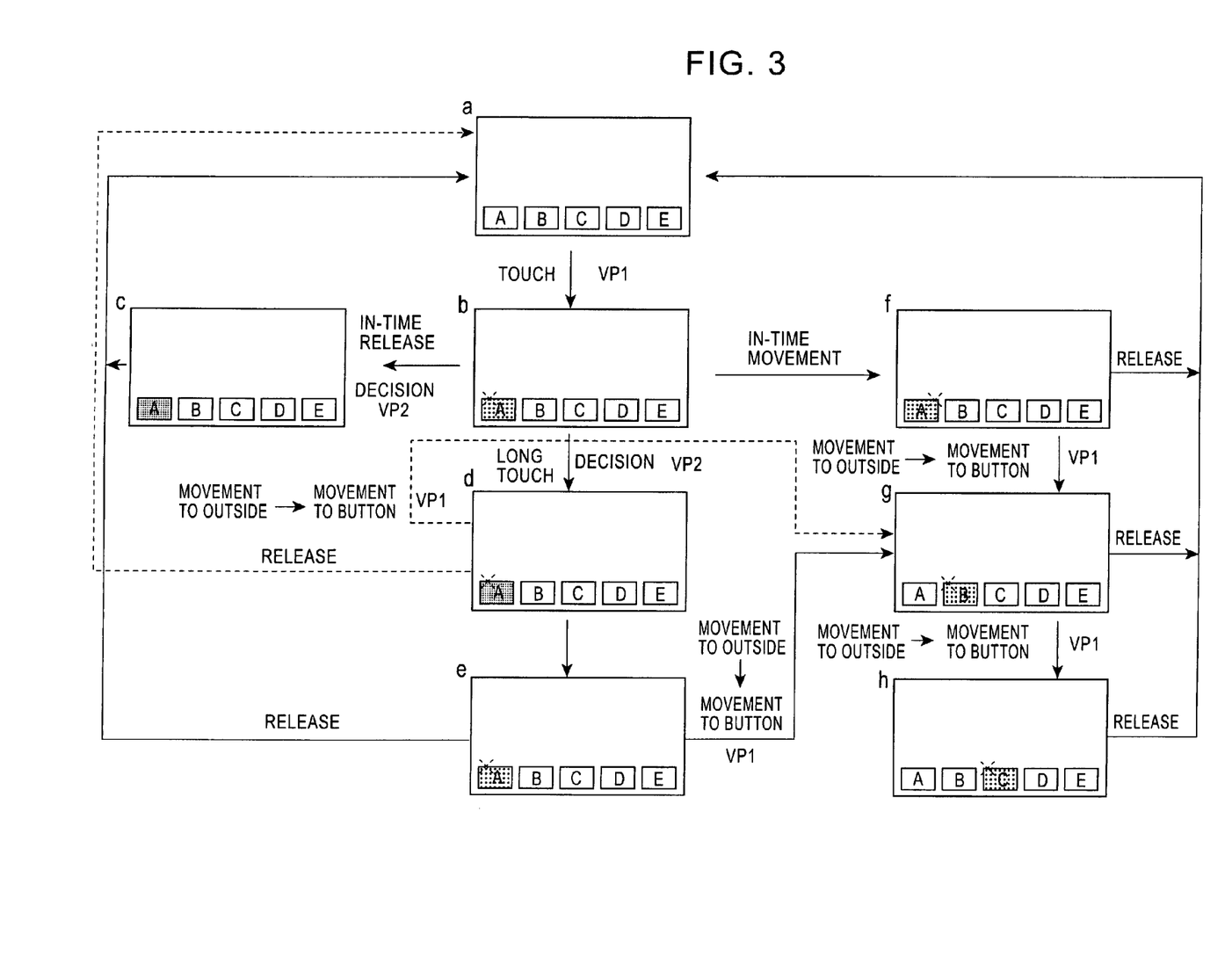
FIG. 3 shows an example of the transition of display according to an embodiment of the present invention.

FIG. 2 is a flowchart of the process of accepting a button operation. FIG. 3 shows an example of transition of the menu window.

As shown in part a of FIG. 3, in the initial state, a plurality of buttons A to E are displayed in an initial display color C0 in the menu window.

In this state, in the process of accepting a button operation, the system waits for the occurrence of touch on a button by a user (step S202). The occurrence of touch on a button can be detected based on a button-touch occurrence event or a move-to-button occurrence event.

Upon the occurrence of touch on a button by the user, the touched button is set to a selected button (step S204). Then, the vibration unit 5 is allowed to generate a vibration pattern VP1 which represents the acceptance of a button selecting operation via the vibration driver 25 and the vibration controller 8 (step S206). Further, the button information 223 is rewritten so that the color of the selected button is changed to a color C1 indicating a selected state (step S208). As a result, in the menu window, the color of the touched button A is changed to the color C1 (e.g., orange) indicating a selected state, as shown in part b in FIG. 3. Incidentally, a mark "x" shown by a broken line in FIG. 3 is added to the figure in order to indicate the position touched by the user. The mark "x" is not actually displayed in the menu window.

Then, a timer A for determining a long touch, which is set for timeout period T1, is started (step S210), and then monitoring is performed in order to detect the occurrence of finger movement by the user (step S212); the occurrence of release (step S214); and the occurrence of a timeout of the timer A (step S216).

Herein, the timeout period T1 of the timer A is 250 msec, for example. The "finger movement" means a user's operation of moving his/her finger along the touch panel 4 from a position to another. The occurrence of finger movement is detected by determining that the touched coordinates have moved by a distance D (e.g., 5 mm) from the coordinates at the occurrence of touch on the button, by referring to the touched coordinates stored in the input processing unit 224. The occurrence of release is detected based on a button-release occurrence event.

If finger movement by the user has occurred (step S212), the process proceeds to step S252.

If release has occurred (step S214), the vibration unit 5 is allowed to generate a vibration pattern VP2 representing the acceptance of a button deciding operation via the vibration driver 25 and the vibration controller 8 (step S232). Then, the button information 223 is rewritten so that the color of the selected button is changed to a color C2 indicating the acceptance of the button deciding operation only for a period T2 (e.g., 150 msec) (step S234). As a result, in the menu window, the color of the released button A is changed to the color C2 indicating the acceptance of a button deciding operation, as shown in part c in FIG. 3.

After the period T2, when the color of the selected button is in the color C2, has passed, the color of the selected button is returned to the initial color C0 (step S236). Then, the main control unit 21 accepts the user's operation of deciding the selected button A (step S238), starts execution of processing corresponding to the selected button A (e.g., control of the operation of the independent-function apparatus 1), and then the process returns to step S202. Accordingly, the display in the menu window returns to part a in FIG. 3.

On the other hand, if a timeout of the timer A occurs in step S216, that is, if the user keeps the button touched for a long time, the vibration unit 5 is allowed to generate the vibration pattern VP2 representing the acceptance of a button deciding operation via the vibration driver 25 and the vibration controller 8 (step S218). Then, the button information 223 is rewritten so that the color of the selected button is changed to the color C2 indicating the acceptance of the button deciding operation (step S220). As a result, in the menu window, the color of the button A touched for a long time is changed to the color C2 indicating the acceptance of the button deciding operation, as shown in part d in FIG. 3.

Then, it is determined whether the selected button is a button for accepting a continuous operation (step S222). Herein, the button for accepting a continuous operation is a button for accepting an operation of constantly performing processing corresponding to the button repeatedly during a time period when the button is being operated, such as a volume turning up/down operation.

If the selected button is not a button for accepting a continuous operation (step S222), the color of the selected button is kept in the color C2 only for the period T2, and then the color of the selected button is returned to C1 indicating a selected state (step S224). Accordingly, in the menu window, the color of the button A touched for a long time is changed to the color C1 indicating the acceptance of a button selecting operation, as shown in part e in FIG. 3.

The main control unit 21 accepts a user's operation of deciding the selected button A (step S226) and starts execution of processing corresponding to the selected button A. Also, monitoring is performed in order to detect occurrence of finger movement to the outside of the range of coordinates of the selected button (step S228) and occurrence of release (step S230).

Herein, the occurrence of finger movement to the outside of the range of coordinates of the selected button is detected based on a move-to-outside occurrence event, and the occurrence of release is detected based on a button-release occurrence event.

If finger movement to the outside of the range of coordinates of the selected button has occurred (step S228), the process proceeds to step S258. If release has occurred (step S230), the color of the selected button is retuned to the initial color C0 (step S250), and then the process returns to step S202. Accordingly, the display of the menu window returns to part a in FIG. 3.

On the other hand, if it is determined that the selected button is a button for accepting a continuous operation in step S222, acceptance of a user's operation of deciding the selected button A is started (step S240) while keeping the color of the selected button in the color C2 indicating the acceptance of the button deciding operation (while maintaining the display state shown in part d in FIG. 3), and the processing corresponding to the selected button A is constantly performed repeatedly until the end of acceptance of the deciding operation. Incidentally, arrows of broken lines shown in FIG. 3 indicate a transition route of display in a case where the selected button is a button for accepting a continuous operation.

After starting the acceptance of an operation of deciding the selected button, which is a button for accepting a continuous operation (step S240), monitoring is performed in order to detect occurrence of release (step S242) and occurrence of finger movement to the outside of the range of coordinates of the selected button (step S244) Herein, the occurrence of finger movement to the outside of the range of coordinates of the selected button is detected based on a move-to-outside occurrence event and the occurrence of release is detected based on a button-release occurrence event.

If finger movement to the outside of the selected button has occurred (step S244), acceptance of the operation of deciding the selected button is ended (step S246) and the process proceeds to step S258. On the other hand, if release has occurred (step S242), acceptance of the operation of deciding the selected button is ended (step S248), the color of the selected button is returned to the initial color C0 (step S250), and then the process returns to step S202. Accordingly, the display in the menu window returns to part a in FIG. 3.

When it is determined in step S212 that finger movement has occurred, the selected button A is displayed in the color C1 indicating a button selected state in the menu window, as shown in part f in FIG. 3.

If it is determined in step S212 that finger movement has occurred, the main control unit 21 performs monitoring in order to detect occurrence of release (step S252) and occurrence of finger movement to the outside of the selected button (step S256). Herein, the occurrence of release is detected based on a button-release occurrence event and the occurrence of finger movement to the outside of the selected button is detected based on a move-to-outside occurrence event. Further, if a move-to-outside occurrence event is generated in parallel with the occurrence of finger movement in step S212, finger movement to the outside of the selected button is detected in step S256.

If a release has occurred (step S252), the color of the selected button is returned to the initial color C0 (step S254), and the process returns to step S202. Accordingly, the display of the menu window returns to part a in FIG. 3.

On the other hand, if finger movement to the outside of the selected button has been detected (step S256), the process proceeds to step S258.

In step S258, which is performed when finger movement to the outside of the selected button is detected in step S228, S244, or S256, the color of the selected button is returned to the initial color C0. Then, the setting of the selected button is canceled (step S260).

Then, monitoring is performed in order to detect occurrence of release (step S262) and occurrence of finger movement to the range of coordinates of a button (step S264). Herein, the occurrence of release is detected based on an outside-of-button release occurrence event, and the occurrence of finger movement to the range of coordinates of a button is detected based on a move-to-button occurrence event. If a move-to-outside occurrence event and a move-to-button occurrence event are generated in parallel with the occurrence of finger movement in step S212, finger movement to the range of a button is detected in step S264.

If release has occurred (step S262), the process returns to step S202. As a result, the display of the menu window returns to part a in FIG. 3.

On the other hand, if finger movement to the range of coordinates of a button has occurred (step S264), the button corresponding to the newly touched position is set to a selected button (step S266). Then, the vibration unit 5 is allowed to generate the vibration pattern VP1 representing acceptance of a button selecting operation via the vibration driver 25 and the vibration controller 8 (step S268). Then, the button information 223 is rewritten so that the color of the selected button is changed to the color C1 indicating a button selected state (step S270). Alternatively, in step S270, these operations may be omitted so that vibration is not generated if finger movement to the range of a button has occurred. Accordingly, when the user moves his/her finger along the panel from button A to button B, the display of the menu window changes in the following manner as shown in parts f and g in FIG. 3. That is, the color of button A is changed to the color C1 indicating a button selected state, and then the color is returned to the initial color C0 in accordance with a movement of touched position to the outside of button A. Then, when the touched position is moved to button B, the color of button B is changed to the color C1 indicating a button selected state.

Then, the process returns to step S256 and the subsequent steps are repeated.

If the user moves his/her finger along the panel from button A to button B, and to button C, the display of the menu window changes as shown in parts f, g, and h in FIG. 3. That is, according to changes of the touched position, the color of buttons A, B, and c is sequentially changed to the color C1 indicating a button selected state.

The process of accepting a button operation has been described above.

Figure 4A:
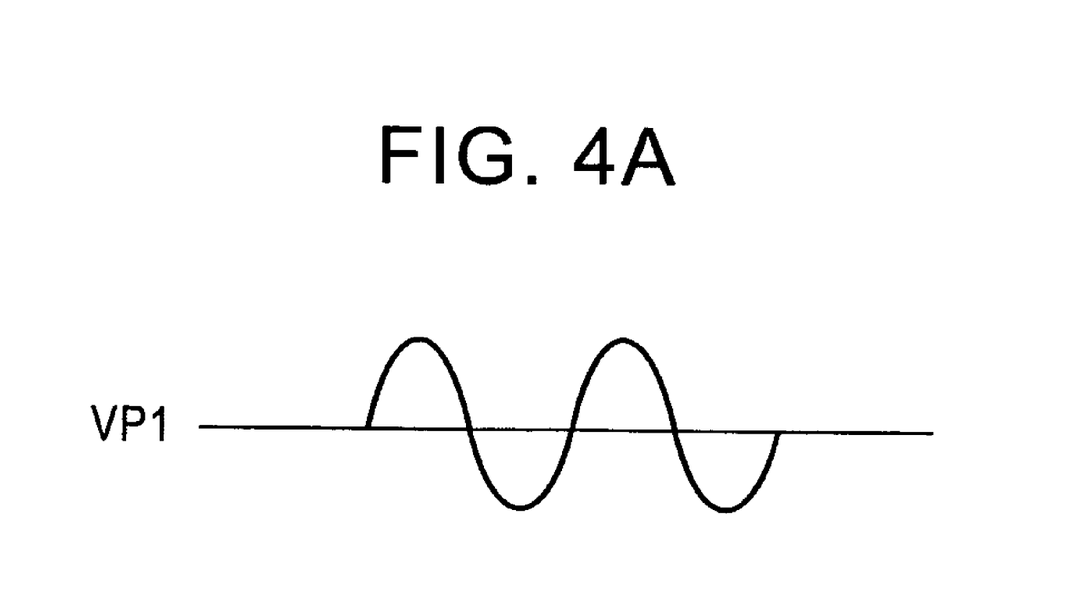
FIGS. 4A and 4B show vibration patterns used in an embodiment of the present invention.
Figure 4B:
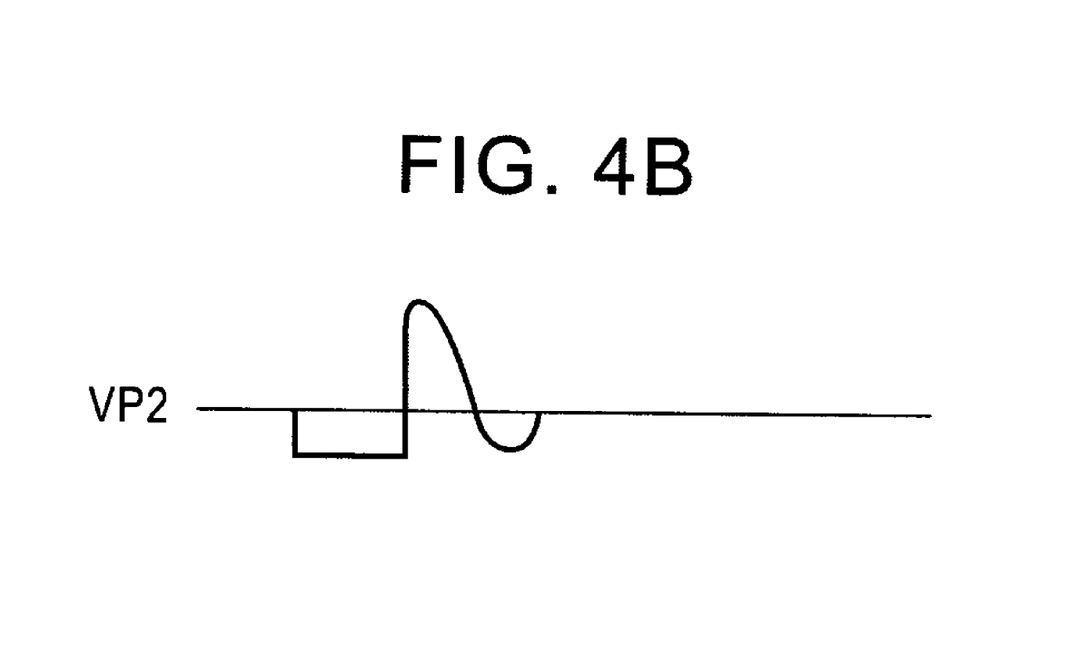

FIG. 4A shows the vibration pattern VP1, which is used for notifying the user of acceptance of a button selecting operation in the process of accepting a button operation, and FIG. 4B shows the vibration pattern VP2, which is used for notifying the user of acceptance of a button deciding operation.

In these figures, FIG. 4A shows the waveform of the vibration pattern VP1 and FIG. 4B shows the waveform of the vibration pattern VP2. As shown in FIG. 4A, the vibration pattern VP1 is in a form of a sine wave and the frequency thereof is 120 kHz, for example. The vibration pattern VP1 gives the user a relatively heavy tactile feel. On the other hand, as shown in FIG. 4B, the vibration pattern VP2 is in a form of a single wave having a steep rise and gives the user a definitive tactile feel.

An embodiment of the present invention has been described above.

As described above, according to the embodiment, a button deciding operation is accepted when the user releases a button after touching the button. Also, when the user keeps a button touched for more than a predetermined period, a button deciding operation is accepted. In this case, however, a button deciding operation is not accepted when a release operation is performed thereafter. In this way, in a case where such a method is applied to a vehicle-mounted system, if the user keeps a button touched for a longer time than necessary, the system accepts the continuous touch as a button deciding operation at a lapse of predetermined time and does not accept a button deciding operation any more. In this method, an operation error caused by mis-touch due to movement of a car or the like can be prevented. Also, in the embodiment, if finger movement by the user has been detected, the system does not accept a button deciding operation thereafter. Therefore, an operation error caused by mis-touch due to movement of a car or the like can be prevented in a vehicle-mounted system.

Further, according to the embodiment, the user moves his/her finger along the touch panel 4 to a desired button and determines a touched position for operating the desired button based on the color of button and vibration. Then, the user once releases his/her finger from the panel and touches the same position again so as to decide the button. In this way, according to the embodiment, the user can perform a button operation without fail.

Incidentally, in the above-described embodiment, if finger movement by the user has been detected, a button deciding operation is not accepted unconditionally thereafter until the user touches a button next time after release. Alternatively, after finger movement has been detected, a button deciding operation by release may be refused and a button deciding operation by long touch may be accepted.

In the above-described embodiment, the main control unit 21 controls changes in the color of a button and vibration. Alternatively, the GUI control unit 22 may perform the control based on definition information of a button-color changing sequence and a vibration generating sequence, which is set by the main control unit 21.

What is claimed is:

1. An input control apparatus for a display device having a touch panel, the input control apparatus comprising:
    a screen display displaying, on the display device, an operation screen which includes at least one button for selecting an operation;
    release accepting means for accepting an operation selected when a user releases his/her finger from a position on the touch panel corresponding to the button on the operation screen within a predetermined time period after touching the position; and
    long-touch accepting means for accepting an operation selected when the user keeps a position on the touch panel corresponding to the button on the operation screen touched for more than the predetermined time period after touching the position, and for refusing acceptance of an operation selected by the release of a button when release occurs thereafter.

2. An input control apparatus according to claim 1, wherein the long-touch accepting means does not accept any further selected operations after accepting a previously selected operation at least until the next touch on the touch panel occurs.

3. An input control apparatus according to claim 1, further comprising finger-movement detecting means for detecting the occurrence of finger movement, in which a touched position on the touch panel moves by more than a predetermined distance, within the predetermined time period, and, if finger movement has been detected, refusing acceptance of an operation selected by the release of a button when release occurs thereafter.

4. An input control apparatus according to claim 3, wherein the finger-movement detecting means determines that finger movement has occurred when it is detected that the touched position has moved by a predetermined distance.

5. An input control apparatus according to claim 3, wherein the display device is included in a vehicle-mounted system.

6. An input control apparatus having a display device with a touch panel, the input control apparatus comprising:
    a screen display displaying, on the display device, an operation screen which includes at least one button for operation selection by a user;
    accepting means for accepting an operation selected according to a predetermined operation by the user after the user has touched a position on the touch panel corresponding to the button on the operation screen; and
    finger-movement detecting means for detecting the occurrence of finger movement, in which a touched position on the touch panel moves by more than a predetermined distance,
    wherein, if the finger-movement detecting means has detected finger movement, the accepting means does not accept any operation selected according to the predetermined operation by the user at least until the next touch on the touch panel occurs.

7. An input control apparatus according to claim 6, wherein the color of the button corresponding to the touched position changes so that the user can distinguish the button from other buttons.

8. An input control apparatus according to claim 6, further comprising:
    vibrating means for vibrating the touch panel; and
    vibration control means for directing the vibrating means to vibrate the touch panel when the user touches a position on the touch panel corresponding to one of the buttons, when the touched position changes to a position corresponding to one of the buttons, or when the operation selected is accepted.

9. An input control apparatus according to claim 8, wherein the vibration control means generates a first vibration pattern when the user touches a position on the touch panel corresponding to one of the buttons or when the touched position changes to a position corresponding to one of the buttons, and generates a second vibration pattern when the operation selected is accepted.

10. An input control apparatus according to claim 9, wherein the first vibration pattern is in a form of a sine wave and the second vibration pattern is in a form of a wave having a steep rise.

11. An input control apparatus according to claim 9, wherein the color of a button when the user touches a position on the touch panel corresponding to the button or when the touched position changes to a position corresponding to the button is different from the color of a button when the operation corresponding to the button is accepted.

12. An input accepting method for accepting input by a user via a user interface apparatus having a display device with a touch panel, the method comprising:
   displaying, on the display device, an operation screen which includes at least one button for selecting an operation;
   accepting an operation selected when a user releases his/her finger from a position on the touch panel corresponding to the button on the operation screen within a predetermined time period after touching the position; and
   accepting an operation selected when the user keeps a position on the touch panel corresponding to the button on the operation screen touched for more than the predetermined time period after touching the position and stopping the acceptance of any further operations at least until the next touch on the touch panel occurs.

13. An input accepting method according to claim 12, further comprising:
   detecting the occurrence of finger movement, in which a touched position on the touch panel moves by more than a predetermined distance; and
   refusing the acceptance of a operation selected when the release of the touch panel occurs after the occurrence of finger movement has been detected.

14. An input accepting method for accepting input by a user via a user interface apparatus having a display device with a touch panel, the method comprising:
   displaying, on the display device, an operation screen which includes at least one button for accepting an operation selected by a user;
   detecting the occurrence of finger movement, in which a touched position on the touch panel moves by more than a predetermined distance; and
   accepting an operation selected according to a predetermined operation by the user after the user has touched a position on the touch panel corresponding to the button on the operation screen until the occurrence of finger movement is detected, after which, refusing the acceptance of any further operations via the touch panel at least until a next touch on the touch panel occurs.

15. An input accepting method according to claim 14, further comprising changing a color of the button corresponding to the touched position so that the user can distinguish the button from other buttons.

16. An input accepting method according to claim 14, further comprising vibrating the touch panel when the user touches a position on the touch panel corresponding to one of the buttons, when the touched position changes to a position corresponding to one of the buttons, or when the operation selected is accepted.

17. A computer-readable medium storing a computer program which is read and executed by a computer having a display device and a touch panel, the computer program directing the computer to:
   display, on the display device, an operation screen which includes at least one button for accepting an operation selected by a user;
   accept an operation of deciding a button when the user releases his/her finger from a position on the touch panel corresponding to the button on the operation screen within a predetermined time period after touching the position; and
   accept an operation of deciding a button when the user keeps a position on the touch panel corresponding to the button on the operation screen touched for more than the predetermined time period after touching the position and stopping the acceptance of any further operations at least until the next touch on the touch panel occurs.

18. A computer-readable medium according to claim 17, the computer program further directing the computer to:
   detect the occurrence of finger movement, in which a touched position on the touch panel moves by more than a predetermined distance; and
   refuse the acceptance of an operation when the release of a button occurs after the occurrence of finger movement has been detected.

19. A computer-readable medium storing a computer program which is read and executed by a computer having a display device and a touch panel, the computer program directing the computer to:
   display, on the display device, an operation screen which includes at least one button for accepting an operation selected by a user;
   detect the occurrence of finger movement, in which a touched position on the touch panel moves by more than a predetermined distance; and
   accept an operation selected according to a predetermined operation by the user after the user has touched a position on the touch panel corresponding to the button on the operation screen until the occurrence of finger movement is detected, and subsequently no longer accepting any further operations via the touch panel at least until a next touch on the touch panel occurs.

20. A computer-readable medium according to claim 19, the computer program further directing the computer to:
   vibrate the touch panel when the user touches a position on the touch panel corresponding to one of the buttons, when the touched position changes to a position corresponding to one of the buttons, or when the operation selected is accepted; and
   change the color of a button to a first color when the user touches a position on the touch panel corresponding to the button or when the touched position changes to a position corresponding to the button and change the color of a button to a second color when the selected operation is accepted, the first and second colors being different from each other.

* * * * *